United States Patent [19]

Kircher

[11] 3,997,693

[45] Dec. 14, 1976

[54] PROCESS FOR APPLYING A HARD WAX PROTECTIVE COATING ON GLASS

[75] Inventor: Burkhard Kircher, Mettmann/Rhl., Germany

[73] Assignee: Centralin Gesellschaft, Chem. Fabrik Kircher & Co., Mettmann, Germany

[22] Filed: Oct. 16, 1974

[21] Appl. No.: 515,152

[30] Foreign Application Priority Data

Oct. 16, 1973  Germany .......................... 2351801

[52] U.S. Cl. .............................. 427/384; 65/60 R; 106/271; 427/421; 428/35; 428/440
[51] Int. Cl.² .................... B05D 1/02; B32B 17/06; C08L 91/06
[58] Field of Search ............. 427/421, 384; 428/35, 428/440; 106/270, 271, 10; 65/60

[56] References Cited

UNITED STATES PATENTS

| | | | |
|---|---|---|---|
| 1,974,854 | 9/1934 | Schrauth | 106/271 X |
| 2,782,124 | 2/1957 | Rosenberg et al. | 106/271 X |
| 2,907,664 | 10/1959 | Schoenholz | 106/271 X |
| 2,925,349 | 2/1960 | Koenig et al. | 106/271 X |
| 3,125,453 | 3/1964 | Simonds | 106/271 X |
| 3,180,750 | 4/1965 | Shippee et al. | 106/270 |
| 3,323,889 | 6/1967 | Carl et al. | 65/60 |
| 3,445,275 | 5/1969 | Bogart | 427/421 X |
| 3,573,239 | 3/1971 | Zdanowski | 106/10 X |
| 3,738,851 | 6/1973 | Jarvis | 106/271 X |

*Primary Examiner*—Ronald H. Smith
*Assistant Examiner*—Stuart D. Frenkel
*Attorney, Agent, or Firm*—Herbert E. Kidder

[57] ABSTRACT

A protective surface coating is formed on the surface of a glass object by spraying an aqueous emulsion of a hard wax onto a surface of the object and removing water from the emulsion by the action of heat.

1 Claim, No Drawings

PROCESS FOR APPLYING A HARD WAX PROTECTIVE COATING ON GLASS

The present invention relates to a process for the protective coating of glass objects.

Surface scratches reduce the strength of glass objects, increase the risk of breakage, and are very liable to form when the objects rub against one another during mass cleaning, packing and transport. It has therefore been proposed to provide glass objects with a protective coating. German patent specification No. 1,291,448 describes coating a glass object with a thin layer of an inorganic salt or organic compound of titanium, zirconium, tin or vanadium, thermally decomposing the compound at a temperature of from 370° to 705° C to give the corresponding metal oxide, cooling the object to a temperature of from 65.5° to 230° C and spraying onto the object a polyolefin, a polyurethane, polystyrene or an alkylammonium acetate. This method employs high temperatures and is extremely time consuming and expensive. It has also been proposed to spray stannic chloride onto glass objects heated to red heat to form a coating of tin oxide, cool the objects to a temperature of from 80° to 100° C and apply to the hot surfaces a coating of ethoxylated stearic acid. This method has the further disadvantage that the ethoxylated stearic acid is soluble in water.

The object of the invention is to provide a process for forming a protective coating on glass objects which is simple to carry out and does not require the use of high temperatures.

We have found that a protective coating can be formed on the surface of a glass object by a process which comprises spraying an aqueous emulsion of a hard wax onto the surface of the object and removing water by the action of heat. The wax forms a surface layer which adheres surprisingly well. The process is simple to carry out and produces a surprisingly effective protective film.

The process is particularly suitable for the protective treatment of glass bottles. The emulsion is preferably applied in the form of a mist or aerosol. The glass object is preferably at a temperature of from 80° to 100° C when the emulsion is applied, in which case the water present evaporates rapidly and no additional heating is required to produce a satisfactory coating.

The emulsion may have a ratio of wax to water of from 1 : 5.5 to 1 : 1000 parts by weight, preferably about 1 : 100 parts by weight and may contain, for example, the following substances other than water (% by weight):

| | |
|---|---|
| 1,3-Butanediol montanoate | 40 |
| Purified carnauba wax | 25 |
| Hard paraffin wax | 20 |
| Non-ionic emulsifier | 15 |

In the above emulsion the 1,3-butanediol montanoate is preferably derived from montanic acid formed by oxidation of montan wax. The hard paraffin wax may be a microcrystalline paraffin wax, and preferably has a melting point of from 50° to 64° C and a penetration of from 10 to 24. The non-ionic emulsifier is preferably an alkyl ethoxylate. If desired an adduct of 70% benzyl alcohol and 30% formaldehyde may be added as preservative.

I claim:
1. A process for forming a protective surface coating on a glass object which comprises spraying an aqueous emulsion of a hard wax on a surface of said object while the object is at a temperature of from 80° to 100° C, said emulsion consisting of water and a mixture of water-free ingredients in the following proportions expressed as % by weight:

| | |
|---|---|
| 1,3-Butanediol montanoate | 40 |
| Purified Carnauba wax | 25 |
| Hard paraffin wax, with melting point of from 50° to 64 C and a penetration of from 10 to 24 | 20 |
| Alkyl Ethoxylate emulsifier | 15 | the said mixture being proportioned with respect to the amount of water so that the hard wax and water are present in the emulsion in a ratio of about 1:100 parts by weight, and said emulsion further containing a preservative additive consisting of a mixture of about 70% benzyl alcohol and 30% formaldehyde; after which spraying operation the water is removed by evaporation.

* * * * *